Patented Oct. 6, 1936

2,056,894

UNITED STATES PATENT OFFICE 2,056,894

CONTAINER FOR HYDROGEN PEROXIDE

Max E. Bretschger, Buffalo, N. Y., assignor to Buffalo Electro-Chemical Company, Inc., Buffalo, N. Y.

No Drawing. Application April 14, 1931, Serial No. 530,143

13 Claims. (Cl. 23—240)

This invention relates to containers for storing and preserving oxidizing materials, more especially to coated metal containers for storing and preserving hydrogen peroxide.

It is well known that concentrated hydrogen peroxide may be stored or shipped in metal tanks. Tin and aluminum, especially the latter, are well adapted for this purpose and have been used for ten volume peroxide.

In storing concentrated hydrogen peroxide in aluminum tanks, however, it has been found that after a time the aluminum is affected by the contact of the vigorous oxidizing agent and corrosion takes place, notwithstanding the well known property of passivity possessed by this metal. For instance hydrogen peroxide of 130 volumes stored in an aluminum container for a period of one week at room temperature has been found to show an increase in non-volatiles of from 30 to 50%, that is, from 0.07% to 0.11%. Furthermore, the hydrogen peroxide itself is affected by contact with the aluminum of the container, or, since the aluminum is rarely chemically pure, very probably traces of foreign metals in the aluminum exert a deleterious catalytic action upon the hydrogen peroxide whereby the stability thereof is greatly decreased. For instance hydrogen peroxide of 130 volumes strength, stored in aluminum of 99.9% purity has been found to be much less impaired in its stability than when stored in commercial aluminum which contains foreign metals, as for instance copper, to the extent of 0.1% or more.

I have found that the corroding action of peroxide upon the aluminum container can be entirely eliminated by providing the tank with a suitable coating; at the same time I am able to prevent the catalytic decomposing action of the metal wall and in fact, impart a certain amount of stability to the peroxide.

In the choice of a suitable coating for the metal container, it is of the utmost importance that the coating have as little action as possible upon the stability of the peroxide. In many instances the peroxide is to be used at elevated temperatures and where the stability has been impaired, great losses of peroxide occur due to heat decomposition.

The result of a series of experiments relating to the efficiency of certain materials as a coating for containers for hydrogen peroxide are set forth below. Samples of hydrogen peroxide of a standard strength and stability were stored for several weeks in the various types of containers listed, and their stability redetermined at the termination of the period. The containers were of aluminum coated with paraffin, bitumen, (asphaltum), beeswax, mixtures of paraffin and petrolatum in various proportions, paraffin and bitumen, and paraffin and beeswax. For comparison containers of aluminum and of glass, both without coatings, were used.

| Container or coating material | Stability at end of period, percent of original |
|---|---|
| Glass | 100.0 |
| Aluminum | 1.0 |
| Paraffin | 100.0 |
| Paraffin and bitumen | 105.0 |
| Paraffin and beeswax | 105.0 |
| Paraffin and petrolatum | 116.0 |

That is, the peroxide stored in aluminum had relatively no stability, while the stability of that stored in the bitumen and paraffin lined tank was not impaired. These results were obtained with concentrated peroxide in which the original stability was rated as 100% in glass containers.

When using a peroxide of a given stability, I was able to increase the stability by the use of a container having a coating of paraffin and petrolatum, paraffin and beeswax, or paraffin and bitumen (asphaltum), the coating consisting partly or wholly of a mixture containing a solid or semi-solid hydro-carbon of the methane series. Thus, such a coating withstood the corrosive oxidizing and destroying action of a thirty-five per cent by weight solution of hydrogen peroxide which had a stability rated as one hundred per cent.

It appears that paraffin itself does not possess the degree of stabilizing action that is possessed by a coating containing an amount of petrolatum mixed therewith. Paraffin alone possesses certain disadvantages as a coating. When subjected to low temperatures, cracking and checking occurs, thus decreasing the adhering qualities of the coating whereby peroxide is brought into contact with the metal. Corrosion occurs and the stability of the peroxide is decreased with concurrent loss of strength.

I have been able to produce coatings of paraffin and petrolatum ranging from ten per cent to ninety per cent paraffin and from ninety per cent to ten per cent petrolatum which possesses none of these disadvantages. A very desirable mixture is obtained by the use of two parts of petrolatum to one part of paraffin. This mixture possesses very desirable adhering qualities when spread upon a metal surface, does not harden materially when subjected to the decreased temperatures which would normally be encountered when shipping commercial quantities of peroxide, nor will the coating melt and float upon the surface of the peroxide as petrolatum itself would do.

I find that by the use of this mixture of petrolatum and paraffin, I am able to coat the lining of a storage vessel or shipping container, such as an aluminum tank car, by spraying the mixture upon the inner surface of the container with a spray gun at an elevated temperature, and obtain a smooth adhering coating which possesses no pin holes whereby contact of metal and peroxide would occur with resultant loss of stability and strength of the peroxide.

In the case of coatings containing paraffin and bitumen, I have been able to produce a good adherent coating containing from five to twenty per cent paraffin and from ninety-five to eighty per cent bitumen by producing an emulsion of these substances. Such an emulsion may be made by dissolving the bitumen in a suitable solvent and adding the paraffin thereto in the form of an emulsion, agitating the mixture to obtain thorough intermixture and distribution of the components thereof. I find that by the use of such a mixture of bitumen and paraffin, I am able to coat the inside of a storage vessel or shipping container, such as an aluminum tank car, by spraying or brushing the mixture upon the inner surface of the container at room temperature, and obtain a smooth adhering coating which resists the corroding action of rather strong solutions of hydrogen peroxide, as for instance solutions of 150 volume and more in strength.

What I claim is:

1. A metal container for hydrogen peroxide having a coating of a mixture of bitumen and paraffin upon the inner surface thereof to protect such surface from contact with hydrogen peroxide, said coating not substantially affecting the quality of the hydrogen peroxide.

2. A metal container for shipment or storage of hydrogen peroxide having a coating of a mixture of beeswax and paraffin upon the inner surface thereof to protect such surface from contact with hydrogen peroxide, said coating not substantially affecting the quality of the hydrogen peroxide.

3. A metal container for hydrogen peroxide having a coating upon the inner surface thereof of a mixture of paraffin and petrolatum to protect such surface from the action of hydrogen peroxide, said coating not substantially affecting the quality of the hydrogen peroxide.

4. A shipping or storage container comprising a metallic vessel, hydrogen peroxide contained in said vessel, and a coating for the interior of the vessel interposed between the hydrogen peroxide and the vessel of a mixture of bitumen and paraffin.

5. A shipping or storage container comprising a metallic vessel, hydrogen peroxide contained in said vessel, and a coating for the interior of the vessel interposed between the hydrogen peroxide and the vessel of a mixture of paraffin and petrolatum.

6. A shipping or storage container comprising a metallic vessel, hydrogen peroxide contained in said vessel, and a coating for the interior of the vessel interposed between the hydrogen peroxide and the vessel of a mixture of beeswax and paraffin.

7. The process of storing or transporting hydrogen peroxide which comprises introducing the peroxide into a metal container having a coating of paraffin and bitumen interposed between the hydrogen peroxide and the metal container, and continuing such interposition during the period of storage or transportation, this container having upon the inner surface thereof the said coating at the cessation of the period of storage or transportation.

8. The storage or transportation of hydrogen peroxide wherein the hydrogen peroxide is contained in a receptacle but separated from contact with the walls of the receptacle by a layer of bitumen and paraffin, the hydrogen peroxide retaining substantially the same strength and quality during the storage or transportation period as is possessed at the inception of the period.

9. A shipping container comprising a metallic tank car, hydrogen peroxide contained in said car and a coating for the interior of the car interposed between the hydrogen peroxide and the car of a mixture of bitumen and paraffin.

10. A shipping container comprising a metallic tank car, hydrogen peroxide contained in said car and a coating for the interior of the car interposed between the hydrogen peroxide and the car of a mixture of paraffin and petrolatum.

11. A shipping container comprising a metallic tank car, hydrogen peroxide contained in said car and a coating for the interior of the car interposed between the hydrogen peroxide and the car of a mixture of beeswax and paraffin.

12. A shipping or storage container for hydrogen peroxide comprising a metallic vessel, a coating comprising bitumen and paraffin upon the inner surface of the vessel to protect such surface from contact with hydrogen peroxide, the ingredients of the coating being in such proportion that the coating adheres to the walls of the vessel and does not check or crack during the extremes of temperature encountered during storage or shipment, and does not materially affect the quality of the hydrogen peroxide.

13. A shipping or storage container for hydrogen peroxide comprising a metallic vessel, a coating consisting solely of bitumen and paraffin upon the inner surface of the vessel to protect such surface from contact with the hydrogen peroxide, the ingredients of the coating being in such proportion that the coating is unaffected by extremes in temperatures encountered during shipment or storage, and does not materially affect the quality of the hydrogen peroxide.

MAX E. BRETSCHGER.